United States Patent
Chen et al.

(10) Patent No.: US 12,278,724 B2
(45) Date of Patent: Apr. 15, 2025

(54) METHOD AND APPARATUS FOR ESTIMATING FREQUENCY OFFSET THROUGH ACCUMULATING COMPLETE FREQUENCY DEVIATION VALUES OF SAMPLES OBTAINED FROM SAMPLING FREQUENCY-MODULATED REPETITION-CODED SEGMENT OF PACKET

(71) Applicant: Airoha Technology Corp., Hsinchu (TW)

(72) Inventors: Jeng-Hong Chen, Manhattan Beach, CA (US); Chun-Yuan Huang, Hsinchu County (TW); Yun-Xuan Zhang, Taipei (TW)

(73) Assignee: Airoha Technology Corp., Hsinchu (TW)

( * ) Notice: Subject to any disclaimer, the term of this patent is extended or adjusted under 35 U.S.C. 154(b) by 91 days.

(21) Appl. No.: 18/138,743

(22) Filed: Apr. 25, 2023

(65) Prior Publication Data
US 2024/0364571 A1    Oct. 31, 2024

(51) Int. Cl.
*H04L 27/26*    (2006.01)
*H04L 27/00*    (2006.01)

(52) U.S. Cl.
CPC ...... *H04L 27/2675* (2013.01); *H04L 27/0014* (2013.01); *H04L 2027/0026* (2013.01)

(58) Field of Classification Search
CPC ............... H04L 27/267; H04L 27/0014; H04L 2027/0026
See application file for complete search history.

(56) References Cited

U.S. PATENT DOCUMENTS

| | | | |
|---|---|---|---|
| 11,438,200 B2* | 9/2022 | Wu | H03D 7/165 |
| 11,736,322 B1* | 8/2023 | Arslan | H04L 25/03203 |
| | | | 375/232 |
| 2005/0185743 A1* | 8/2005 | Li | H04L 7/042 |
| | | | 375/350 |
| 2010/0158165 A1 | 6/2010 | Myong | |

FOREIGN PATENT DOCUMENTS

| | | |
|---|---|---|
| CN | 115695122 A | 2/2023 |
| CN | 115735356 A | 3/2023 |
| TW | I407737 B1 | 9/2013 |
| TW | I420831 B | 12/2013 |
| TW | I431988 B | 3/2014 |

* cited by examiner

*Primary Examiner* — David S Huang
(74) *Attorney, Agent, or Firm* — Winston Hsu

(57) ABSTRACT

A frequency offset (FO) estimation method includes: sampling a frequency-modulated repetition-coded segment of a packet to generate a plurality of samples; obtaining a frequency deviation (FD) value for each of a plurality of target samples selected from the plurality of samples; and estimating an FO value through accumulating complete FD values of the plurality of target samples.

14 Claims, 8 Drawing Sheets

METHOD AND APPARATUS FOR ESTIMATING FREQUENCY OFFSET THROUGH ACCUMULATING COMPLETE FREQUENCY DEVIATION VALUES OF SAMPLES OBTAINED FROM SAMPLING FREQUENCY-MODULATED REPETITION-CODED SEGMENT OF PACKET

BACKGROUND OF THE INVENTION

1. Field of the Invention

The present invention relates to a wireless receiver design, and more particularly, to a method and apparatus for estimating frequency offset through accumulating complete frequency deviation values of samples obtained from sampling a frequency-modulated repetition-coded segment (e.g., header or payload) of a packet.

2. Description of the Prior Art

In wireless communications, information is partitioned into packets to be transmitted and received between transmitters and receivers at scheduled or non-scheduled time instants. A header, which specifies the crucial information, especially, for the receiver(s), is required at the beginning of each packet. To protect the crucial information in the header, a coding scheme is often applied. A straightforward idea is to repeat every bit of the crucial information some predefined number of times, for example, three times. For example, a 3-time repetition coding is adopted in the Bluetooth (BT) specification to protect 18-bit link control information, thus resulting in a 54-bit repetition-coded header of a BT packet. Specifically, each bit of an original header (which includes 18-bit link control information) is repeated 3 times, and then the resulting 54-bit repetition-coded header is processed by Gaussian frequency-shift keying (GFSK) modulation for transmission. To decode the received GFSK modulated header, a simple frequency deviation (FD) algorithm, which measures the phase difference between two received samples, is applied. An information bit is determined at the optimal sampling timing according to its FD value. If an FD value of a sample obtained at the optimal sampling timing is non-negative, then an information bit "1" is decoded. Otherwise, an information bit, "0" is decoded.

Frequency offset (FO) is a major impairment that degrades performance of a BT receiver. As mentioned above, decoding of each information bit depends on the FD value. The FD value may be deviated from an expected value due to an undesired bias introduced by FO, which may cause a decision error, especially, in a low signal-to-noise ratio (SNR) or multipath environment. Thus, there is a need for an innovative design to alleviate the adverse effect caused by FO for receiver performance improvement.

SUMMARY OF THE INVENTION

One of the objectives of the claimed invention is to provide a method and apparatus for estimating frequency offset through accumulating complete frequency deviation values of samples obtained from sampling a frequency-modulated repetition-coded segment (e.g., header or payload) of a packet.

According to a first aspect of the present invention, an exemplary frequency offset (FO) estimation method is disclosed. The exemplary FO estimation method includes: sampling a frequency-modulated repetition-coded segment of a packet to generate a plurality of samples; obtaining a frequency deviation (FD) value for each of a plurality of target samples selected from the plurality of samples; and estimating an FO value through accumulating complete FD values of the plurality of target samples.

According to a second aspect of the present invention, an exemplary frequency offset (FO) estimation apparatus is disclosed. The exemplary FO estimation apparatus includes a sampling circuit, a frequency deviation (FD) computation circuit, and an FO computation circuit. The sampling circuit is arranged to sample a frequency-modulated repetition-coded segment of a packet to generate a plurality of samples. The FD computation circuit is arranged to obtain an FD value for each of a plurality of target samples selected from the plurality of samples output from the sampling circuit. The FO computation circuit is arranged to estimate an FO value through accumulating complete FD values of the plurality of target samples.

According to a third aspect of the present invention, an exemplary frequency offset (FO) estimation method is disclosed. The exemplary FO estimation method includes: determining optimal sampling timing for a frequency-modulated repetition-coded segment of a packet; sampling the frequency-modulated repetition-coded segment to generate a plurality of samples; obtaining a frequency deviation (FD) value for each of a plurality of target samples selected from the plurality of samples, wherein the target samples comprise first samples obtained from sampling the frequency-modulated repetition-coded segment at non-optimal sampling timing; and estimating an FO value through accumulating FD values of the plurality of target samples.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
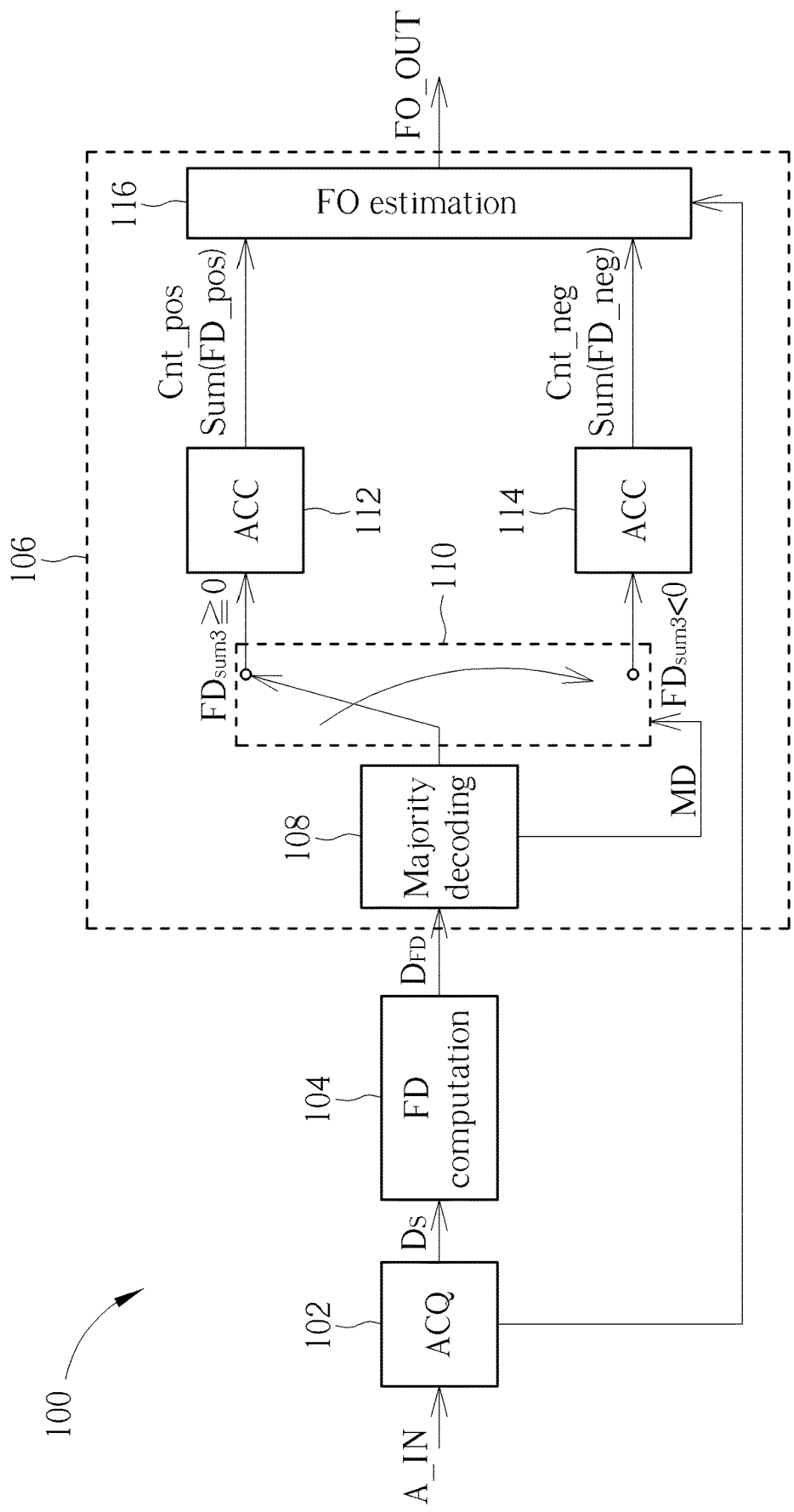
FIG. 1 is a diagram illustrating a first FO estimation apparatus according to an embodiment of the present invention.

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

If the major portion of FO can be precisely estimated and compensated at the end of a packet header, then there is a great benefit in decoding a following non-repetition-coded packet part (e.g., payload) without a degradation of performance resulting from FO. Thus, there is a need for an innovative FO estimation design which is capable of precisely estimating an FO value for receiver performance improvement.

Since a frequency deviation (FD) value may be deviated from an expected value due to an undesired bias introduced by frequency offset (FO), FD values may be used for FO estimation. Specifically, taking decoding of a Bluetooth (BT) packet for example, FD values are constantly changing during bit transitions except at a packet header which is repeated for 3 times per bit. To reduce the redundancy and maximize the data throughput, FO is best to be estimated at the packet header which is the only section with repetition coding. Furthermore, an FD value of the current bit (which corresponds to a sample obtained at the optimal sampling timing) is not a constant value due to the fact that its value is a sum of FD values from GFSK encoded bits before and after the current bit. In addition, due to the repetition coding, the "expected" FD values (except FD values of samples obtained during bit transitions) are the same in theory. Hence, the repetition-coded packet header may provide samples suitable for optimal FO estimation in a packet. Based on above observation, the present invention proposes estimating frequency offset through accumulating complete frequency deviation values of samples obtained from sampling a frequency-modulated repetition-coded header of a packet (e.g., a GFSK-modulated 3-time repetition coded header of a BT packet). It should be noted that, if the payload of a packet is repetition-coded, the same FO estimation concept proposed by the present invention may be applied to samples included in the repetition-coded payload for optimal FO estimation. For better comprehension of technical features of the present invention, the following assumes that the repetition-coded packet header is used for optimal FO estimation. Further details of the proposed frequency offset estimation technique are described as below with reference to the accompanying drawings.

FIG. 1 is a diagram illustrating a first FO estimation apparatus according to an embodiment of the present invention. By way of example, but not limitation, the FO estimation apparatus 100 may be a part of a wireless receiver such as a BT receiver. The FO estimation apparatus 100 includes a sampling circuit (labeled by "ACQ") 102, an FD computation circuit (labeled by "FD computation") 104, and an FO computation circuit 106, where the FO computation circuit 106 includes a majority decoding circuit (labeled by "Majority decoding") 108, a switch circuit 110, a plurality of accumulator circuits (labeled by "ACC") 112, 114, and an FO estimation circuit (labeled by "FO estimation") 116. It should be noted that only the components pertinent to the present invention are illustrated in FIG. 1. In practice, the FO estimation apparatus 100 is allowed to have additional components for achieving other designated functions, and is implemented by digital circuits.

The sampling circuit 102 is arranged to sample a frequency-modulated repetition-coded header A_IN of a packet to generate a plurality of samples $D_S$. For better comprehension of technical features of the present invention, the following assumes that the frequency-modulated repetition-coded header A_IN is a GFSK-modulated 3-time repetition coded header of a BT packet. However, this is for illustrative purposes only, and is not meant to be a limitation of the present invention. In practice, any wireless receiver, for example which operates using any communications protocol, using the proposed FO estimation technique falls within the scope of the present invention.

The FD computation circuit 104 is arranged to calculate an FD value for each of the samples $D_S$ according to a simple FD algorithm, and provide a plurality of FD values $D_{FD}$ to the FO computation circuit 106 for further processing, where the FD values $D_{FD}$ include a plurality of FD values associated with a plurality of target samples selected from the samples $D_S$ output from the sampling circuit 102, and the FD values of the target samples are used by the FO computation circuit 106 for FO estimation.

In this embodiment, the sampling circuit 102 may generate the samples $D_S$ by oversampling the frequency-modulated repetition-coded header (e.g., GFSK-modulated 3-time repetition coded header) A_IN. That is, the sampling rate of the GFSK-modulated 3-time repetition coded header A_IN is higher than the GFSK symbol rate of the GFSK-modulated 3-time repetition coded header A_IN. Hence, the FD values $D_{FD}$ output from the FD computation circuit 104 may be regarded as up-sampled FD values.

Figure 2:
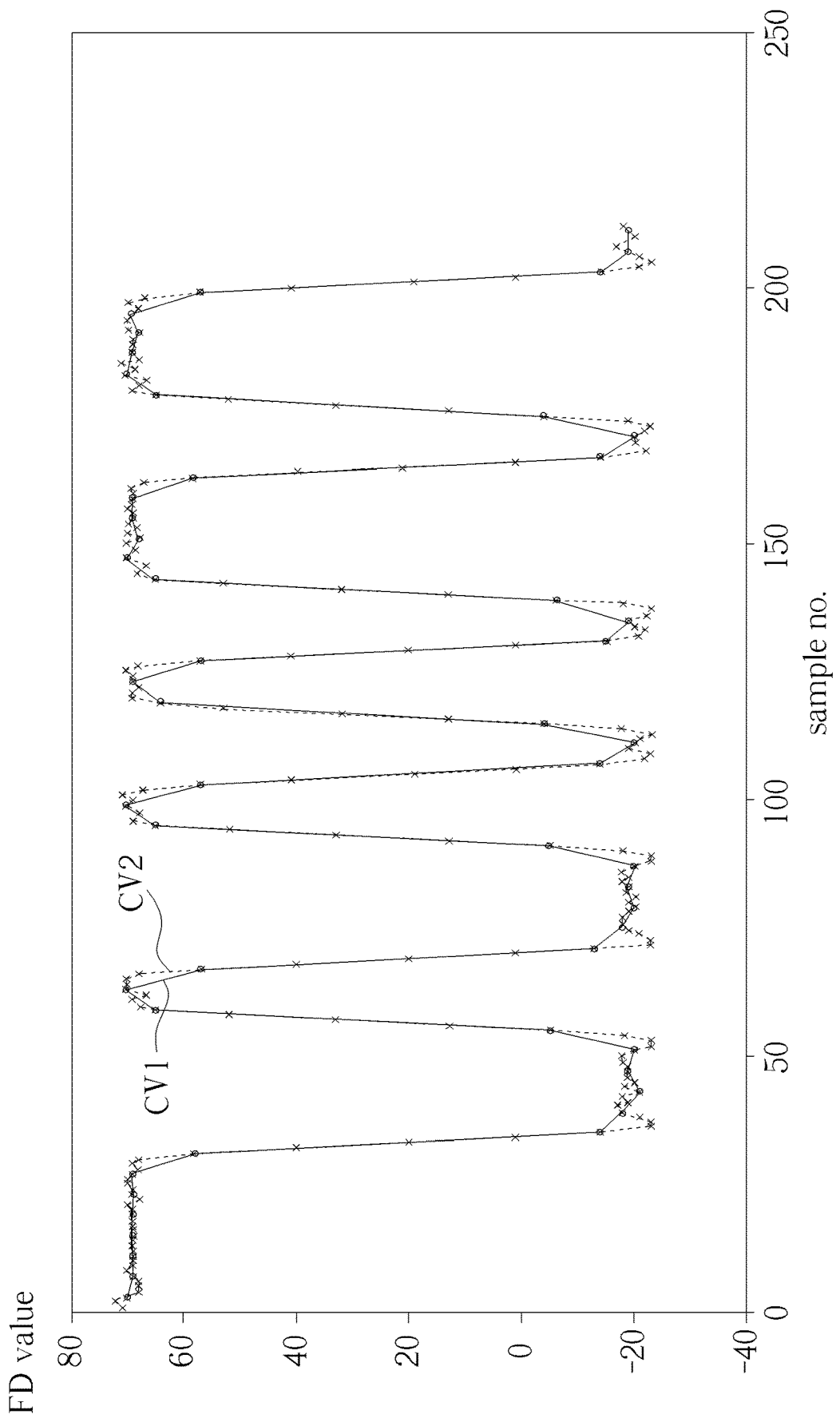
FIG. 2 is a diagram illustrating an example of 216 FD values of a 54 us GFSK-modulated header at a sampling rate of four times per one microsecond.

FIG. 2 is a diagram illustrating an example of 216 (i.e., 4×54) FD values of a 54 us (i.e., 3×18 us) GFSK-modulated header (nUp=4 or a 4-time up-sampling rate and 3-time repetition). The horizontal axis represents sample numbers (or sample indexes) of $1^{st}$ sample to $216^{th}$ sample that are obtained by oversampling the GFSK-modulated 3-time repetition coded header. The vertical axis represents FD values of $1^{st}$ sample to $216^{th}$ sample. Each symbol "x" is indicative of one up-sampled FD value calculated for one sample. Each symbol "o" is indicative of one FD value calculated for one sample at optimal sampling timing (i.e., optimal GFSK symbol decoding timing). BT specification specifies that one bit of data is modulated in one GFSK symbol, and one GFSK symbol is transmitted in one microsecond (us). Since an 18-bit header is protected by 3-time repetition coding and then modulated by GFSK, the 54 us (i.e., 3×18 us) GFSK-modulated header includes 54 GFSK symbols. Hence, the number of FD values calculated for samples at optimal sampling timing (i.e., optimal GFSK symbol decoding timing) is equal to 54, as illustrated by the characteristic curve CV1. Information bits carried by the GFSK-modulated header are decoded from checking the sign of FD values calculated for samples at optimal sampling timing. In addition, since nUp (i.e., up-sampling rate) is equal to 4, there are 4 samples per 1 us (i.e., one GFSK symbol time). The number of up-sampled FD values calculated for the GFSK-modulated header is equal to 216, as illustrated by the characteristic curve CV2.

In this embodiment, the sampling circuit 102 is further arranged to determine optimal sampling timing for the frequency-modulated repetition-coded header (e.g., GFSK-modulated 3-time repetition coded header) A_IN, and informs the majority decoding circuit 108 of the determined optimal sampling timing. For example, a BT packet includes an access code which precedes the header and is also GFSK-modulated, and can be used for determining the optimal sampling timing.

Figure 3:
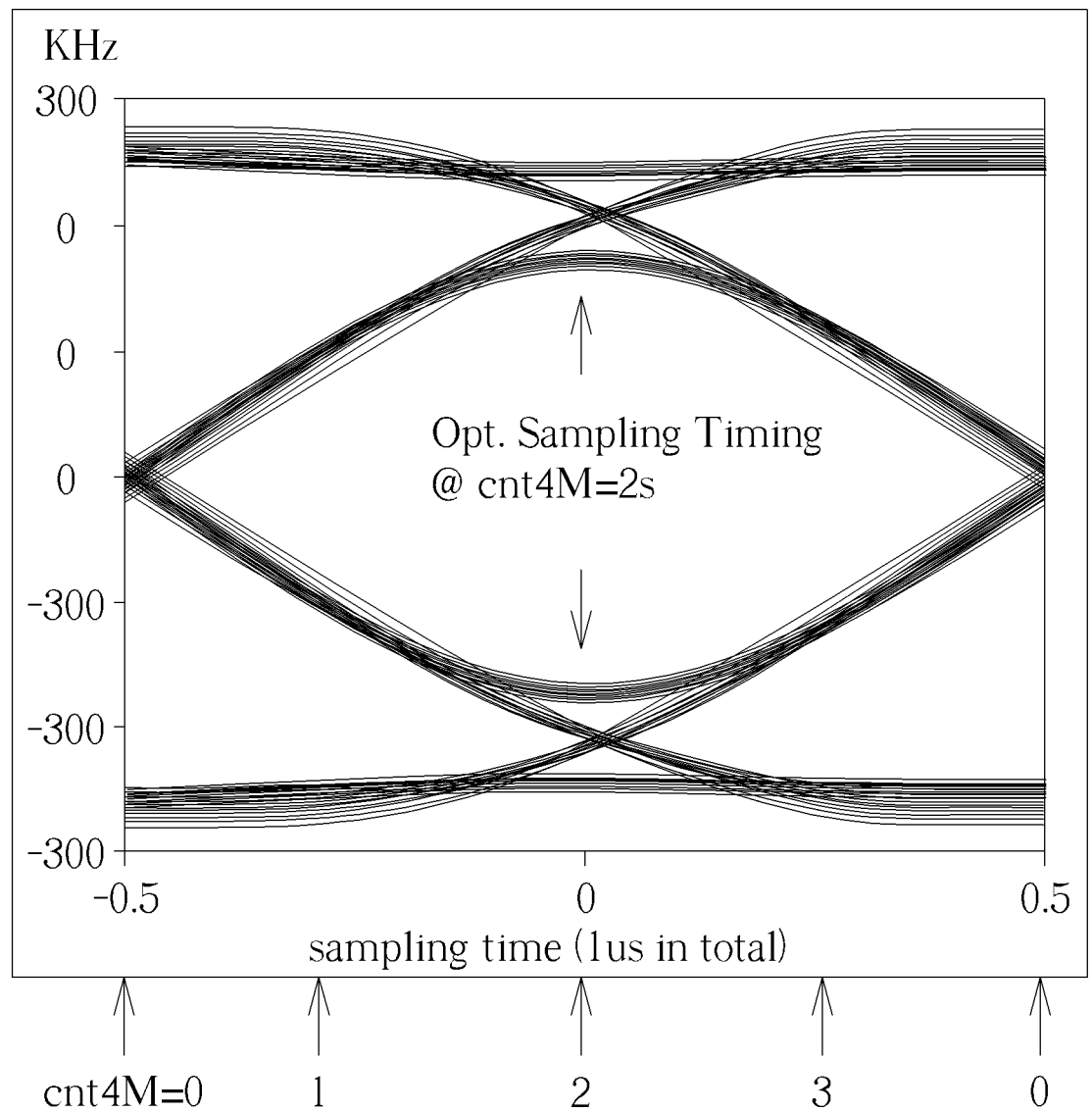
FIG. 3 is an eye diagram of the GFSK-modulated header according to an embodiment of the present invention.

FIG. 3 is an eye diagram of the GFSK-modulated header according to an embodiment of the present invention. There are 4 samples in one 1 us GFSK symbol time (nUp=4), and are indexed by a counter value, cnt4M={0, 1, 2, 3}, where the counter value cnt4M is reset to 0 after a sample indexed by cnt4M=3 is generated. As shown in FIG. 3, the optimal sampling timing is the timing instant at cnt4M=2. Hence, each sample indexed by cnt4M=2 is regarded as a sample obtained at the optimal sampling timing.

The FO computation circuit 106 is arranged to estimate an FO value FO_OUT through accumulating complete FD values of the target samples selected from the samples $D_S$ output from the sampling circuit 102. Compared to using partial FD values of samples for FO estimation, accumulating complete FD values of samples for FO estimation can obtain a more precise FO value. Specifically, when an FD value FD(n) of a sample is generated from the FD computation circuit 104, the FO computation circuit 106 accumulates the complete FD value FD(n) (i.e., full information of FD(n)) rather than a partial FD value W*FD(n) (i.e., partial information of FD(n)), where the partial FD value W*FD(n) is merely a fraction of the complete FD value FD(n), and 0<W<1. Further details are described as below with reference to the accompanying drawings.

In further detail, in the present invention, an FO value FO_OUT is generated by averaging FD values of the target samples, and therefore the FD values of the target samples have equal weighting in calculating the FO value FO_OUT and none of the FD values is negligible, which means that each of the FD values used by computation of the FO value FO_OUT is complete, and all FD values used by computation of the FO value FO_OUT have equal significance. Contrarily, in a linear tracking approach, an FO value is expressed as FO(n+1)=(1−α) FO(n)+α $FD_{avg}$(n+1), where FO(n+1) represents a current FO value, FO(n) represents a previous FO value, $FD_{avg}$ (n+1) represents an average FD value of a current FD group, and α is a constant value. In a case where there are 18 FD groups, FO(0)=0, and α is 0.1, the FO values FO(1), FO(2), FO(3), and FO(18) can be expressed as follows:

$$FO(1) = (1-\alpha)^1 \times FO(0) + \alpha FD_{avg}(1)$$
$$FO(2) = (1-\alpha)^1 \times FO(1) + \alpha FD_{avg}(2) =$$
$$(1-\alpha)^2 \times FO(0) + \alpha(1-\alpha)FD_{avg}(1) + \alpha FD_{avg}(2)$$
$$FO(3) = (1-\alpha)^1 \times FO(2) + \alpha FD_{avg}(3) =$$
$$(1-\alpha)^3 \times FO(0) + \alpha((1-\alpha))^2 FD_{avg}(1) + \alpha((1-\alpha))^1 FD_{avg}(2) + \alpha FD_{avg}(3)$$
$$...$$
$$FO(18) = (1-\alpha)^{18} \times FO(0) +$$
$$\alpha(1-\alpha)^{17} \times FD_{avg}(1) + ... + \alpha(1-\alpha)FD_{avg}(17) + \alpha FD_{avg}(18)$$

Due to inherent characteristic of linear tracking, FO(18) is dominated by the last several FD groups associated with, for example, $FD_{avg}$(17) or $FD_{avg}$(18), which have relatively high weighting, α(1−α) for $FD_{avg}$(17) and α for $FD_{avg}$(18). However, $FD_{avg}$(1) is with extremely low weighting (i.e., α(1−α)^17=0.1(1−0.1)^17), and therefore is negligible. Such result means that the FD value is partial, and demonstrates its disadvantages where if an average FD value of the last several FD groups is inaccurate, the final FO value FO(18) is inaccurate even though an average FD value of the beginning several FD groups is accurate.

In a first FO estimation design proposed by the present invention, the number of target samples selected from the samples $D_S$ is equal to the number of information bits carried by the frequency-modulated repetition-coded header A_IN (e.g., 18-bit link control information carried by the GFSK-modulated 3-time repetition coded header of BT packet). Specifically, each of the target samples is obtained from sampling the frequency-modulated repetition-coded header A_IN (e.g., GFSK-modulated 3-time repetition coded header of BT packet) at the optimal sampling timing decided by the sampling circuit 102.

Figure 4:
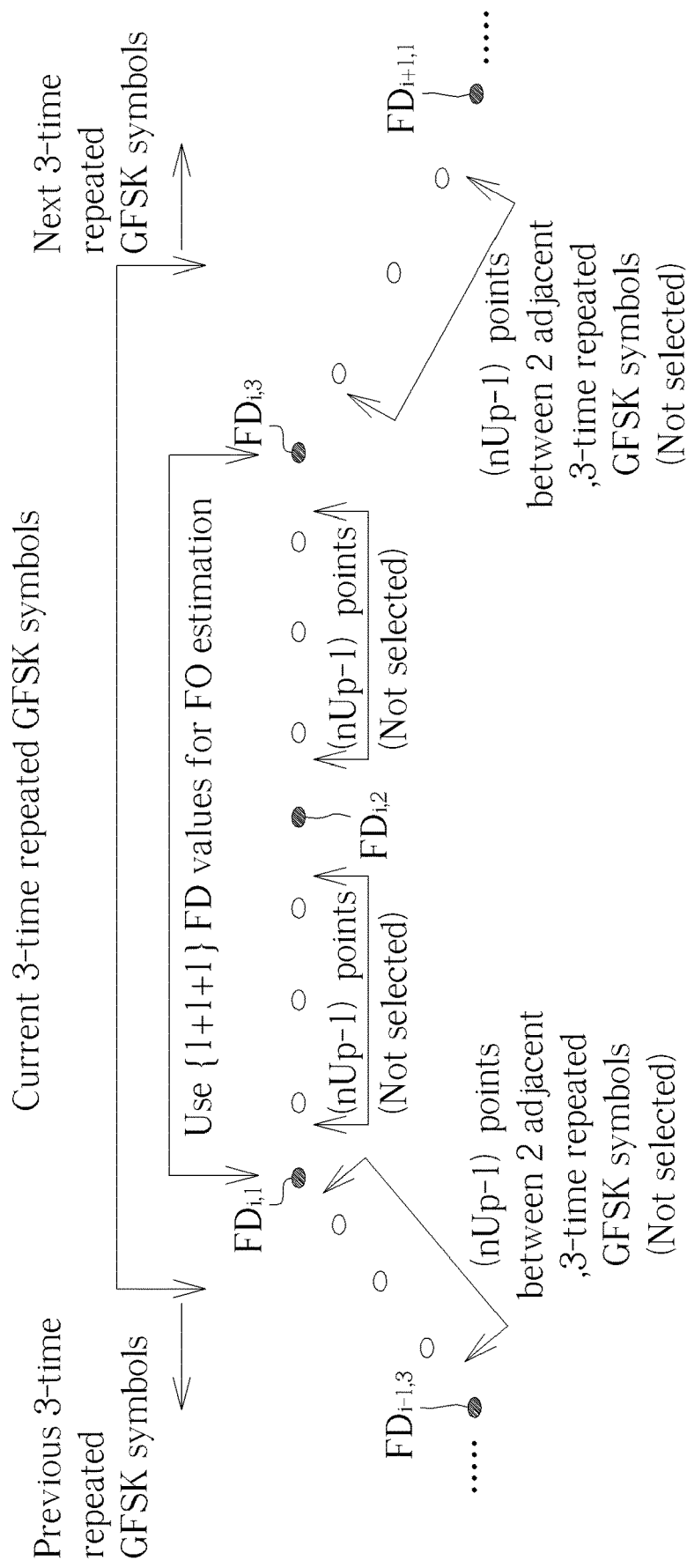
FIG. 4 is a diagram illustrating selection of FD values used for FO estimation according to the first FO estimation design proposed by the present invention.

Please refer to FIG. 4 in conjunction with FIG. 1. FIG. 4 is a diagram illustrating selection of FD values used for FO estimation according to the first FO estimation design proposed by the present invention. As mentioned above, the sampling circuit 102 oversamples the frequency-modulated repetition-coded header A_IN (e.g., GFSK-modulated 3-time repetition coded header of BT packet) with a sampling rate higher than a GFSK symbol rate, such that up-sampled FD values $D_{FD}$ are provided to the majority decoding circuit 108. Supposing that each of total N (e.g., N=18) GFSK information bits is repeated M (e.g., M=3) times and nUp=4, there are 216 FD values, and FIG. 4 shows only a portion of 216 FD values for brevity.

FD values of samples at the optimal sampling timing can be expressed as $FD_{i,j}$, where i={1, 2, . . . , N} and j= {1, 2, . . . , M}, where N represents the total number (e.g., N=18) of GFSK information bits, and M represents the number of repetition times (e.g., M=3). In a case where N=18 and M=3, the FD values of samples at the optimal sampling timing include $FD_{1,1}$, $FD_{1,2}$, $FD_{1,3}$, $FD_{2,1}$, $FD_{2,2}$, $FD_{2,3}$, $FD_{3,1}$, $FD_{3,2}$, $FD_{3,3}$, . . . $FD_{17,1}$, $FD_{17,2}$, $FD_{17,3}$, $FD_{18,1}$, $FD_{18,2}$ and $FD_{18,3}$.

The majority decoding circuit 108 selects FD values $FD_{i,1}$, $FD_{i,2}$, $FD_{i,3}$ of samples at the optimal sampling timing for calculating an FD sum $FD_{sum3,i}$ ($FD_{sum3,i}=\Sigma_{j=1}^{M}FD_{i,j}=FD_{i,1}+FD_{i,2}+FD_{i,3}$, where i={1, 2, . . . , N}, j={1, 2, . . . , M}, the value "3" in the subscript sum3,i is indicative of the number of repetition times being equal to 3, and $FD_{i,j}$=FD values selected in the $i^{th}$ repeated GFSK symbols), where the selected 3 samples belong to the same bit repetition group $G_i$ that begins with a sample having the FD value $FD_{i,1}$ and ends with a sample having the FD value $FD_{i,3}$.

It should be noted that FD values of samples at non-optimal sampling timing are not selected for FO estimation according to the first FO estimation design, where the FD values of samples at non-optimal sampling timing include FD values of samples in each bit repetition group (e.g., FD values between $FD_{i,1}$ and $FD_{i,2}$ and FD values between $FD_{i,2}$ and $FD_{i,3}$, regarding the bit repetition group $G_i$) and FD values of samples between adjacent bit repetition groups. As shown in FIG. 4, a previous bit repetition group $G_{i-1}$ ends with a sample having an FD value $FD_{i-1,3}$, and a next bit repetition group $G_{i+1}$ begins with a sample having an FD value $FD_{i+1,1}$. In this example, there is a bit transition "0"→"1" between the previous bit repetition group $G_{i-1}$ and the current bit repetition group $G_i$, and there is a bit transition "1"→"0" between the current bit repetition group $G_i$ and the next bit repetition group $G_{i+1}$. None of FD values of samples between adjacent bit repetition groups is selected for FO estimation.

The majority decoding circuit 108 generates a majority decoding result $MD_i$ for the current bit repetition group $G_i$ by checking if the FD sum, for example, $FD_{sum3,i}$ in an M=3 case, is a non-negative value or a negative value. When the FD sum $FD_{sum3,i}$ is a non-negative value (i.e., $FD_{sum3,i} \geq 0$), the majority decoding result $MD_i$ is set by 1. When the FD sum $FD_{sum3,i}$ is a negative value (i.e., $FD_{sum3,i} < 0$), the majority decoding result $MD_i$ is set by 0. The switch circuit 110 is controlled by the majority decoding result $MD_i$ of the current bit repetition group $G_i$ for forwarding the FD sum $FD_{sum3,i}$ to one of the accumulator circuits 112 and 114.

The accumulator circuit 112 is arranged to maintain a counter value Cnt_pos and an accumulated FD sum Sum (FD_pos), where the counter value Cnt_pos is initialized by a zero value, and the accumulated FD sum Sum(FD_pos) is initialized by a zero value. When the FD sum $FD_{sum3,i}$ is a non-negative value (i.e., $FD_{sum3,i} \geq 0$), the switch circuit 110 outputs the FD sum $FD_{sum3,i}$ to the accumulator circuit 112, and the accumulator circuit 112 updates the counter value Cnt_pos and the accumulated FD sum Sum(FD_pos), where Cnt_pos=Cnt_pos+3, and Sum(FD_pos)=Sum(FD_pos)+ $FD_{sum3,i}$. Since each FD sum $FD_{sum3,i}$ is derived from accumulating 3 FD values, an increment of the counter value Cnt_pos is set by 3.

The accumulator circuit 114 is arranged to maintain a counter value Cnt_neg and an accumulated FD sum Sum (FD_neg), where the counter value Cnt_neg is initialized by a zero value, and the accumulated FD sum Sum(FD_neg) is initialized by a zero value. When the FD sum $FD_{sum3,i}$ is a negative value (i.e., $FD_{sum3,i} < 0$), the switch circuit 110 outputs the FD sum $FD_{sum3,i}$ to the accumulator circuit 114, and the accumulator circuit 114 updates the counter value Cnt_neg and the accumulated FD sum Sum(FD_neg), where Cnt_neg=Cnt_neg+3, and Sum(FD_neg)=Sum(FD_neg)+ $FD_{sum3,i}$. Since each FD sum $FD_{sum3,i}$ is derived from accumulating 3 FD values, an increment of the counter value Cnt_neg is set by 3. To put it simply, when one FD sum $FD_{sum3,i}$ is output from the majority decoding circuit 108, one of the counter values Cnt_pos, Cnt_neg is updated and one of the accumulated FD sums Sum(FD_pos), Sum(FD_ neg) is updated.

When the last sample of the frequency-modulated repetition-coded header A_IN (e.g., GFSK-modulated 3-time repetition coded header of BT packet) is generated by the sampling circuit 102, the sampling circuit 102 informs the FO estimation circuit 116 of the end of the frequency-modulated repetition-coded header A_IN (e.g., GFSK-modulated 3-time repetition coded header of BT packet). The FO estimation circuit 116 is arranged to calculate the FO value FO_OUT at the end of the frequency-modulated repetition-coded header A_IN (e.g., GFSK-modulated 3-time repetition coded header of BT packet) indicated by the sampling circuit 102. For example, estimation of the FO value FO_OUT can be expressed using the following formula.

$$FO\_OUT = \frac{1}{2}\left(\frac{Sum(FD\_pos)}{Cnt\_pos} + \frac{Sum(FD\_neg)}{Cnt\_neg}\right) \quad (1)$$

Regarding the first FO estimation design proposed by the present invention, only FD values of samples obtained at optimal sampling timing are selected for FO estimation. However, this is for illustrative purposes only, and is not meant to be a limitation of the present invention. Alternatively, in addition to the FD values of samples obtained at optimal sampling timing, certain FD values of samples obtained at non-optimal sampling timing may also be selected for improving the FO estimation accuracy.

Figure 5:
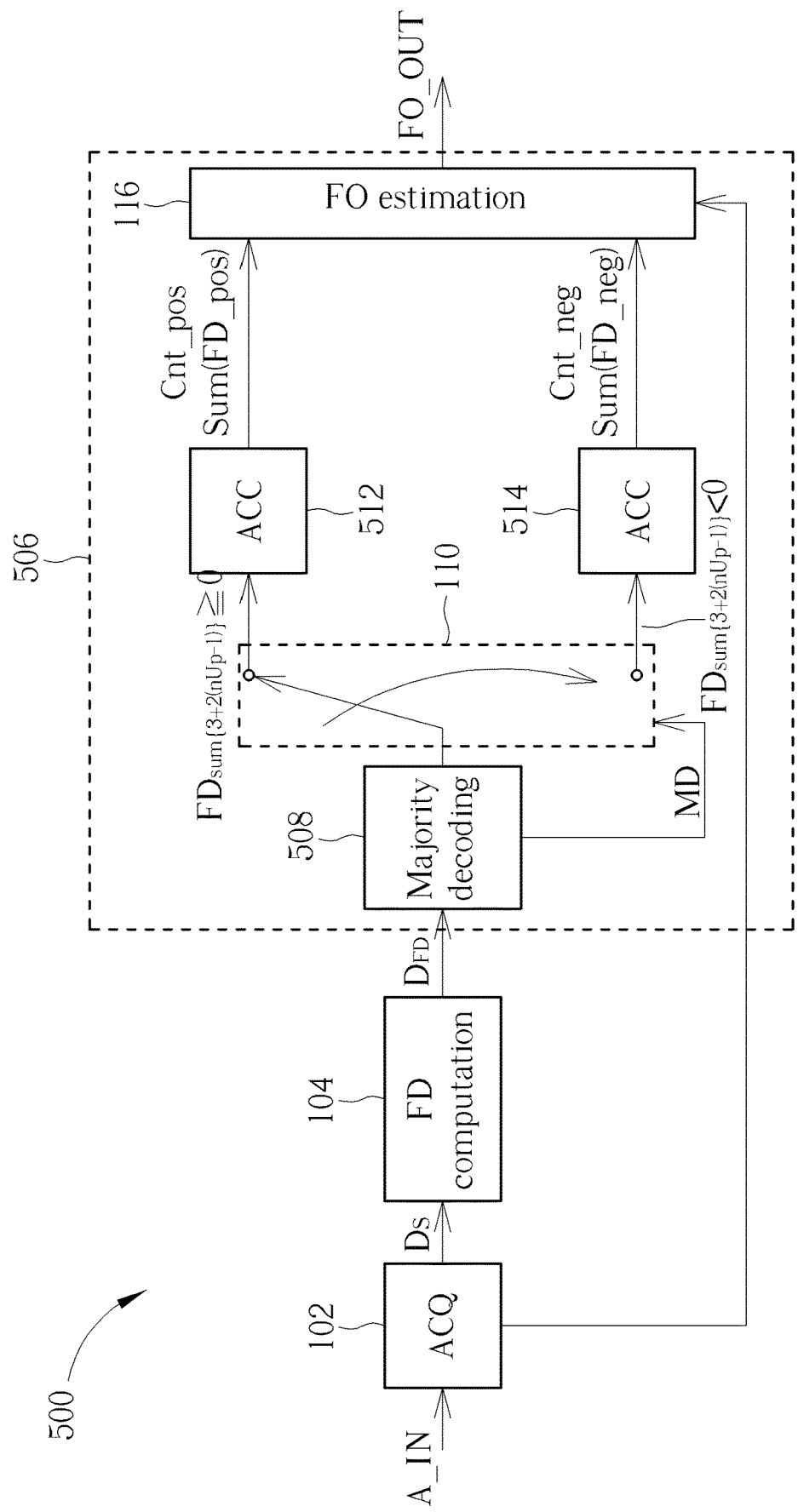
FIG. 5 is a diagram illustrating a second FO estimation apparatus according to an embodiment of the present invention.

FIG. 5 is a diagram illustrating a second FO estimation apparatus according to an embodiment of the present invention. By way of example, but not limitation, the FO estimation apparatus 500 may be a part of a wireless receiver such as a BT receiver. The FO estimation apparatus 500 includes an FO computation circuit 506 and the aforementioned sampling circuit 102 and FD computation circuit 104, where the FO computation circuit 506 includes a majority decoding circuit (labeled by "Majority decoding") 508, a plurality of accumulator circuits (labeled by "ACC") 512, 514, and the aforementioned switch circuit 110 and FO estimation circuit 116. It should be noted that only the components pertinent to the present invention are illustrated in FIG. 5. In practice, the FO estimation apparatus 500 is allowed to have additional components for achieving other designated functions.

The FO computation circuit 506 is arranged to estimate an FO value FO_OUT through accumulating complete FD values of the target samples selected from the samples $D_S$ output from the sampling circuit 102. Compared to using partial FD values (i.e., partial information of FD values) of samples for FO estimation, accumulating complete FD values (i.e., full information of FD values) of samples for FO estimation can obtain a more precise FO value. In a second FO estimation design proposed by the present invention, the number of target samples selected from the samples $D_S$ is larger than the number of information bits carried by the frequency-modulated repetition-coded header A_IN (e.g., 18-bit link control information carried by the GFSK-modulated 3-time repetition coded header of BT packet). Specifically, the major difference between the second FO estimation design and the first FO estimation design is that the target samples include samples obtained from sampling the frequency-modulated repetition-coded header A_IN (e.g., GFSK-modulated 3-time repetition coded header of BT packet) at the optimal sampling timing, and further include certain samples obtained from sampling the frequency-modulated repetition-coded header A_IN (e.g., GFSK-modulated 3-time repetition coded header of BT packet) at the non-optimal sampling timing deviated from the optimal sampling timing.

Figure 6:
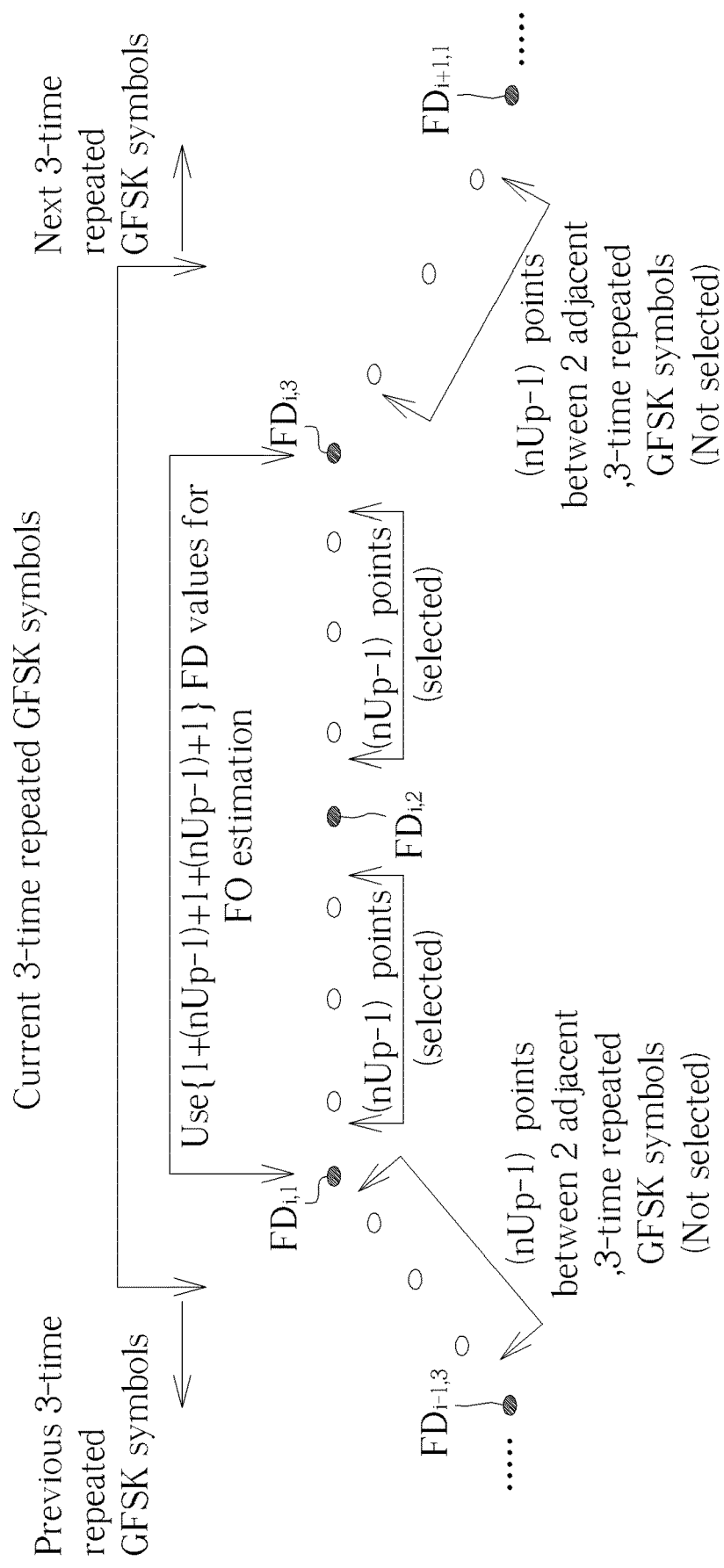
FIG. 6 is a diagram illustrating selection of FD values used for FO estimation according to the second FO estimation design proposed by the present invention.

Please refer to FIG. 6 in conjunction with FIG. 5. FIG. 6 is a diagram illustrating selection of FD values used for FO estimation according to the second FO estimation design proposed by the present invention. The sampling circuit 102 oversamples the frequency-modulated repetition-coded header A_IN (e.g., GFSK-modulated 3-time repetition coded header of BT packet) with a sampling rate higher than a GFSK symbol rate, such that up-sampled FD values $D_{FD}$ are provided to the majority decoding circuit 508. Supposing that each of total N (e.g., N=18) GFSK information bits is repeated M (e.g., M=3) times and nUp=4, there are 216 FD values, and FIG. 6 shows only a portion of 216 FD values for brevity. In a case where N=18 and M=3, the FD values of samples at the optimal sampling timing include $FD_{1,1}$, $FD_{1,2}$, $FD_{1,3}$, $FD_{2,1}$, $FD_{2,2}$, $FD_{2,3}$, $FD_{3,1}$, $FD_{3,2}$, $FD_{3,3}$, . . . $FD_{17,1}$, $FD_{17,2}$, $FD_{17,3}$, $FD_{18,1}$, $FD_{18,2}$ and $FD_{18,3}$.

Supposing that each of total N (e.g., N=18) GFSK information bits is repeated M (e.g., M=3) times, the majority decoding circuit 508 selects FD values $FD_{i,1}$, $FD_{i,2}$, $FD_{i,3}$ of samples at the optimal sampling timing and additional up-sampled FD values of samples between samples at the optimal sampling timing for calculating an FD sum $FD_{sum\{3+2(nUp-1)\},i}$ ($FD_{sum\{3+2(nUp-1)\},i} = \sum_{j=1}^{M+(M-1)(nUp-1)} FD_{i,j}$, where i={1, 2, . . . , N}, j={1, 2, . . . , M+(M−1) (nUp−1)}, the value "3" in the subscript sum{3+2 (nUp−1)},i is indicative of the number of repetition times being equal to 3, and $FD_{i,j}$=FD values selected in the $i^{th}$ repeated GFSK symbols), where the selected M+(M−1)(nUp−1) samples include first samples belonging to the same bit repetition group $G_i$ that begins with a first sample having the FD value $FD_{i,1}$ and ends with a first sample having the FD value $FD_{i,3}$ in the time domain, and also include second samples between two first samples having the FD values $FD_{i,1}$ and $FD_{i,2}$ in the time domain and second samples between two first samples having the FD values $FD_{i,2}$ and $FD_{i,3}$ in the time domain, where the first samples are obtained at optimal sampling timing, and the second samples are obtained at non-optimal sampling timing.

It should be noted that, in accordance with the second FO estimation design, some of FD values of samples at non-optimal sampling timing are selected for FO estimation, while some of FD values of samples at non-optimal sampling timing are not selected for FO estimation. The FD values of samples at non-optimal sampling timing may include FD values of samples in each bit repetition group (e.g., FD values between $FD_{i,1}$ and $FD_{i,2}$ and FD values between $FD_{i,2}$ and $FD_{i,3}$, regarding the bit repetition group $G_i$) and FD values of samples between adjacent bit repetition groups. As shown in FIG. 6, a previous bit repetition group $G_{i-1}$ ends with a sample having an FD value $FD_{i-1,3}$, and a next bit repetition group $G_{i+1}$ begins with a sample having an FD value $FD_{i+1,1}$. In this example, there is a bit transition "0"→"1" between the previous bit repetition group $G_{i-1}$ and the current bit repetition group $G_i$, and there is a bit transition "1"→"0" between the current bit repetition group $G_i$ and the next bit repetition group $G_{i+1}$. In accordance with the second FO estimation design proposed by the present invention, all FD values of samples between adjacent bit repetition groups are not selected for FO estimation.

The majority decoding circuit 508 generates a majority decoding result $MD_i$ for the current bit repetition group $G_i$ by checking if the FD sum, for example, $FD_{sum\{3+2(nUp-1)\},i}$ in an M=3 case, is a non-negative value or a negative value. When the FD sum $FD_{sum\{3+2(nUp-1)\},i}$ is a non-negative value (i.e., $FD_{sum\{3+2(nUp-1)\},i} \geq 0$), the majority decoding result $MD_i$ is set by 1. When the FD sum $FD_{sum\{3+2(nUp-1)\},i}$ is a negative value (i.e., $FD_{sum\{3+2(nUp-1)\},i} < 0$), the majority decoding result $MD_i$ is set by 0. The switch circuit 110 is controlled by the majority decoding result $MD_i$ of the current bit repetition group $G_i$ for forwarding the FD sum $FD_{sum\{3+2(nUp-1)\},i}$ to one of the accumulator circuits 512 and 514.

The accumulator circuit 512 is arranged to maintain a counter value Cnt_pos and an accumulated FD sum Sum(FD_pos), where the counter value Cnt_pos is initialized by a zero value, and the accumulated FD sum Sum(FD_pos) is initialized by a zero value. When the FD sum $FD_{sum\{3+2(nUp-1)\},i}$ is a non-negative value (i.e., $FD_{sum\{3+2(nUp-1)\},i} \geq 0$), the switch circuit 110 outputs the FD sum $FD_{sum\{3+2(nUp-1)\},i}$ to the accumulator circuit 512, and the accumulator circuit 512 updates the counter value Cnt_pos and the accumulated FD sum Sum(FD_pos), where Cnt_pos=Cnt_pos+3+2(nUp−1), and Sum(FD_pos)=Sum(FD_pos)+$FD_{sum\{3+2(nUp-1)\},i}$. Since each FD sum $FD_{sum\{3+2(nUp-1)\},i}$ is derived from accumulating [3+2(nUp−1)] FD values, an increment of the counter value Cnt_pos is set by [3+2 (nUp−1)].

The accumulator circuit 514 is arranged to maintain a counter value Cnt_neg and an accumulated FD sum Sum(FD_neg), where the counter value Cnt_neg is initialized by a zero value, and the accumulated FD sum Sum(FD_neg) is initialized by a zero value. When the FD sum $FD_{sum\{3+2(nUp-1)\},i}$ is a negative value (i.e., $FD_{sum\{3+2(nUp-1)\},i} < 0$), the switch circuit 110 outputs the FD sum $FD_{sum\{3+2(nUp-1)\},i}$ to the accumulator circuit 514, and the accumulator circuit 514 updates the counter value Cnt_neg and the accumulated FD sum Sum(FD_neg), where Cnt_neg=Cnt_neg+3+2(nUp−1), and Sum(FD_neg)=Sum(FD_neg)+$FD_{sum\{3+2(nUp-1)\},i}$. Since each FD sum $FD_{sum\{3+2(nUp-1)\},i}$ is derived from accumulating [3+2(nUp−1)] FD values, an increment of the counter value Cnt_neg is set by [3+2(nUp−1)]. To put it simply, when one FD sum $FD_{sum\{3+2(nUp-1)\},i}$ is output from the majority decoding circuit 508, one of the counter values Cnt_pos, Cnt_neg is updated and one of the accumulated FD sums Sum(FD_pos), Sum(FD_neg) is updated.

When the last sample of the frequency-modulated repetition-coded header A_IN (e.g., GFSK-modulated 3-time repetition coded header of BT packet) is generated by the sampling circuit 102, the sampling circuit 102 informs the FO estimation circuit 116 of the end of the frequency-modulated repetition-coded header A_IN (e.g., GFSK-modulated 3-time repetition coded header of BT packet). The FO estimation circuit 116 is arranged to calculate the FO value FO_OUT at the end of the frequency-modulated repetition-coded header A_IN (e.g., GFSK-modulated 3-time repetition coded header of BT packet) indicated by the sampling circuit 102. For example, estimation of the FO value FO_OUT can be expressed using the aforementioned formula (1).

Regarding the second FO estimation design proposed by the present invention, all FD values of samples between adjacent bit repetition groups are not selected for FO estimation. However, this is for illustrative purposes only, and is not meant to be a limitation of the present invention. Alternatively, if a predetermined criterion is met, some FD values of samples between adjacent bit repetition groups are allowed to be selected for further accuracy improvement of FO estimation.

Figure 7:
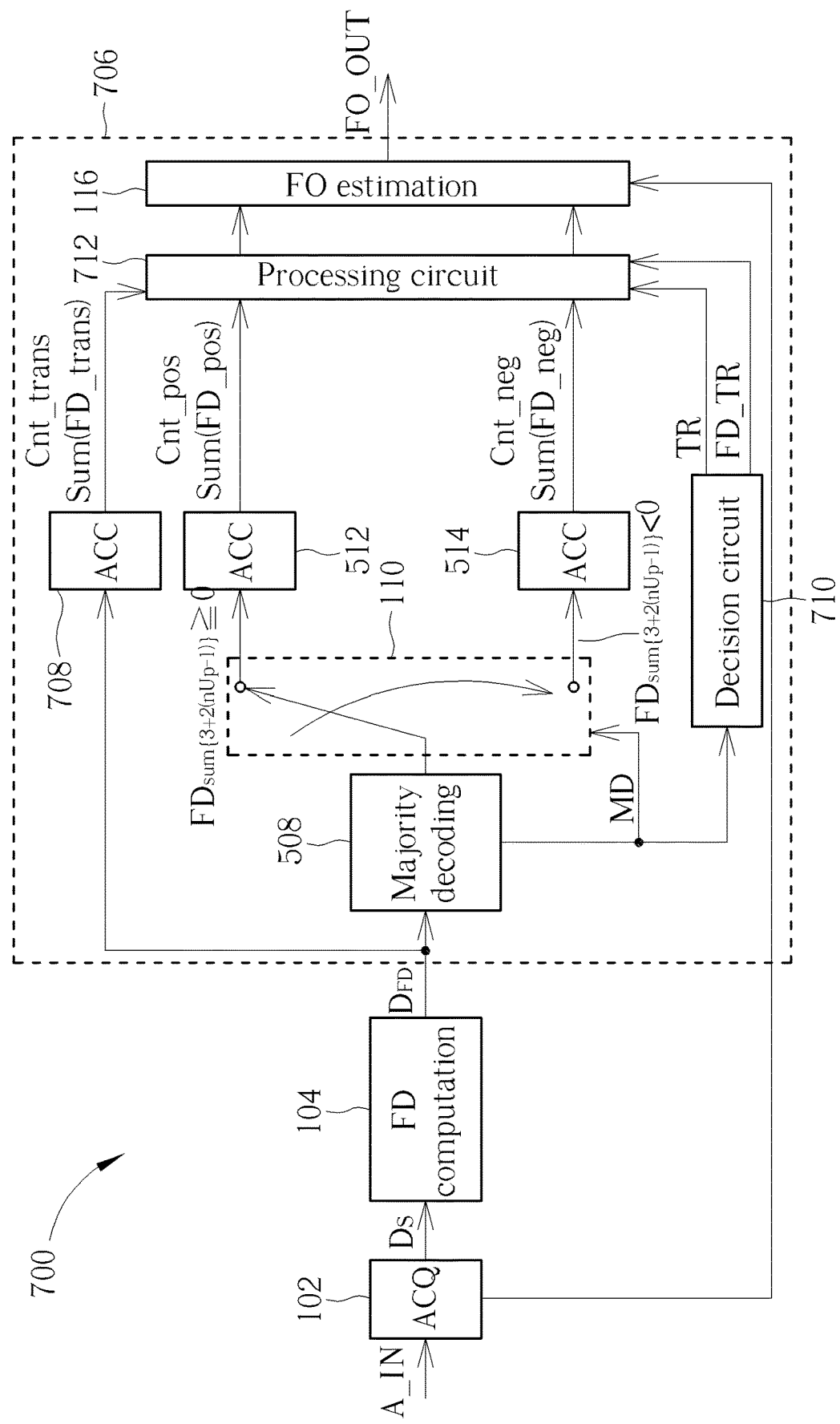
FIG. 7 is a diagram illustrating a third FO estimation apparatus according to an embodiment of the present invention.

FIG. 7 is a diagram illustrating a third FO estimation apparatus according to an embodiment of the present invention. By way of example, but not limitation, the FO estimation apparatus 700 may be a part of a wireless receiver such as a BT receiver. The FO estimation apparatus 700 includes an FO computation circuit 706 and the aforementioned sampling circuit 102 and FD computation circuit 104, where the FO computation circuit 706 includes the aforementioned majority decoding circuit 508, accumulator circuits 512 and 514, switch circuit 110 and FO estimation circuit 116, and further includes an accumulator circuit 708, a decision circuit 710, and a processing circuit 712. It should be noted that only the components pertinent to the present invention are illustrated in FIG. 7. In practice, the FO estimation apparatus 700 is allowed to have additional components for achieving other designated functions.

The accumulator circuit 708 is arranged to maintain a counter value Cnt_trans (Cnt_trans=nUp−1) and an FD sum Sum(FD_trans) for (nUp−1) samples obtained between a last sample (obtained at optimal sampling timing) in time domain of a previous bit repetition group and a first sample (obtained at optimal sampling timing) in time domain of a current bit repetition group. According to the third FO estimation design, the counter value Cnt_trans (Cnt_trans=nUp−1) is selectively added to one of the counter values Cnt_pos and Cnt_neg according to a detection result of the bit transition "0"→"1" or "1"→"0", and the FD sum Sum(FD_trans) is selectively added to one of the accumulated FD sums Sum(FD_pos) and Sum(FD_neg) according to a detection result of the bit transition "0"→"1" or "1"→"0".

In this embodiment, the decision circuit 710 is arranged to detect if bit transition "0"→"1" or "1"→"0" occurs between a previous bit repetition group $G_{i-1}$ and a current bit repetition group $G_i$. As mentioned above, the majority decoding circuit 508 generates the majority decoding result $MD_i$ for the current bit repetition group $G_i$ by checking if the FD sum, for example, $FD_{sum\{3+2(nUp-1)\},i}$ in an M=3 case, is a non-negative value or a negative value. When the FD sum $FD_{sum\{3+2\ (nUp-1)\},i}$ is a non-negative value (i.e., $FD_{sum\{(3+2(nUp-1)\},i} \geq 0$), the majority decoding result $MD_i$ is set by 1. Similarly, the majority decoding circuit 508 generates a majority decoding result $MD_{i-1}$ for the previous bit repetition group $G_{i-1}$. The majority decoding result $MD_{i-1}$ is indicative of an information bit that is repeated 3 times for creating the previous bit repetition group $G_{i-1}$. The majority decoding result $MD_i$ is indicative of an information bit that is repeated 3 times for creating the current bit repetition group $G_i$. When a comparison result of the majority decoding results $MD_{i-1}$ and $MD_i$ indicates that there is a bit transition "0"→"1" between the previous bit repetition group $G_{i-1}$ and the current bit repetition group $G_i$, the decision circuit 710 sets a control signal TR by a first logic value (TR=1) to indicate that a bit-transition is detected. When a comparison result of the majority decoding results $MD_{i-1}$ and $MD_i$ indicates that there is a bit transition "1"→"0" between the previous bit repetition group $G_{i-1}$ and the current bit repetition group $G_i$, the decision circuit 710 sets the control signal TR by the first logic value (TR=1) to indicate that a bit-transition is detected. When a comparison result of the majority decoding results $MD_{i-1}$ and $MD_i$ indicates that there is no bit transition "0"→"1" or "1"→"0" between the previous bit repetition group $G_{i-1}$ and the current bit repetition group $G_i$, the decision circuit 710 sets the control signal TR by a second logic value (TR=0) to indicate the absence of bit-transition, and further sets another control signal FD_TR, where FD_TR=1 if $MD_{i-1}=MD_i$ and $MD_{i-1}=1$, and FD_TR=0 if $MD_{i-1}=MD_i$ and $MD_{i-1}=0$.

In this embodiment, the control signal TR acts as an enabling signal of an updating function of the processing circuit 712. For example, the updating function of the processing circuit 712 is enabled when TR=0 (i.e., when bit transition is not detected), and is disabled when TR=1 (i.e., when bit transition is detected).

In a caser where the updating function of the processing circuit 712 is disabled due to bit transition between $G_{i-1}$ and $G_i$ being detected (TR=1), the accumulator circuit 708 may reset the counter value Cnt_trans to an initial value (i.e., Cnt_trans=0), and reset the FD sum Sum(FD_trans) to an initial value (i.e., Sum(FD_trans)=0), such that the current counter values Cnt_pos and Cnt_neg and the current accumulated FD sums Sum(FD_pos) and Sum(FD_neg) remain unchanged. After the counter value Cnt_trans and the FD sum Sum(FD_trans) are reset, the accumulator circuit 708 re-calculates the counter value Cnt_trans and the FD sum Sum(FD_trans) for samples obtained between the current bit repetition group $G_i$ and the next bit repetition group $G_{i+1}$, where the re-calculated counter value Cnt_trans and FD sum Sum(FD_trans) may be selectively used for updating one of the counter values Cnt_pos and Cnt_neg and one of the accumulated FD sums Sum(FD_pos) and Sum(FD_neg), depending on the setting of the control signal TR.

In another case where the updating function of the processing circuit 712 is enabled due to bit transition between $G_{i-1}$ and $G_i$ being not detected (TR=0), the processing circuit 712 is arranged to add the counter value Cnt_trans (Cnt_trans=nUp−1) to one of the counter values Cnt_pos and Cnt_neg according to the control signal FD_TR, and add the FD sum Sum(FD_trans) to one of the accumulated FD sums Sum(FD_pos) and Sum(FD_neg) according to the control signal FD_TR. For example, when FD_TR=1, the processing circuit 712 adds the counter value Cnt_trans (Cnt_trans=nUp−1) to the current counter value Cnt_pos, that is, Cnt_pos=Cnt_pos+(nUp−1), and further adds the FD sum Sum(FD_trans) to the current accumulated FD sum Sum(FD_pos), that is, Sum(FD_pos)=Sum(FD_pos)+Sum(FD_trans); and when FD_TR=0, the processing circuit 712 adds the counter value Cnt_trans (Cnt_trans=nUp−1) to the current counter value Cnt_neg, that is, Cnt_neg=Cnt_neg+(nUp−1), and further adds the FD sum Sum(FD_trans) to the current accumulated FD sum Sum(FD_neg), that is, Sum(FD_neg)=Sum(FD_neg)+Sum(FD_trans). Next, the accumulator circuit 708 resets the counter value Cnt_trans to an initial value (i.e., Cnt_trans=0), resets the FD sum Sum(FD_trans) to an initial value (i.e., Sum(FD_trans)=0), and then re-calculates the counter value Cnt_trans and the FD sum Sum(FD_trans) for samples obtained between the current bit repetition group $G_i$ and the next bit repetition group $G_i$+, where the re-calculated counter value Cnt_trans and FD sum Sum(FD_trans) may be selectively used for updating one of the counter values Cnt_pos and Cnt_neg and one of the accumulated FD sums Sum(FD_pos) and Sum(FD_neg), depending on the setting of the control signal TR.

The FO computation circuit 706 is arranged to estimate an FO value FO_OUT through accumulating complete FD values of target samples selected from the samples $D_S$ output from the sampling circuit 102. Compared to using partial FD values (i.e., partial information of FD values) of samples for FO estimation, accumulating complete FD values (i.e., full information of FD values) of samples for FO estimation can obtain a more precise FO value. In the third FO estimation design proposed by the present invention, the number of target samples selected from the samples $D_S$ is larger than the number of information bits carried by the frequency-modulated repetition-coded header A_IN (e.g., 18-bit link control information carried by the GFSK-modulated 3-time repetition coded header of BT packet). Specifically, the major difference between the third FO estimation design and the second FO estimation design is that the target samples include samples obtained from sampling the frequency-modulated repetition-coded header A_IN (e.g., GFSK-modulated 3-time repetition coded header of BT packet) at the optimal sampling timing, and certain samples obtained from sampling the frequency-modulated repetition-coded header A_IN (e.g., GFSK-modulated 3-time repetition coded header of BT packet) at the non-optimal sampling timing deviated from the optimal sampling timing, where FD values of samples between adjacent bit repetition groups, each including (nUp−1) samples, such as 3 samples if nUP=4, obtained at non-optimal sampling timing, may be selected for FO estimation if no bit transition "0"→"1" or "1"→"0" is detected between the adjacent bit repetition groups.

Figure 8:
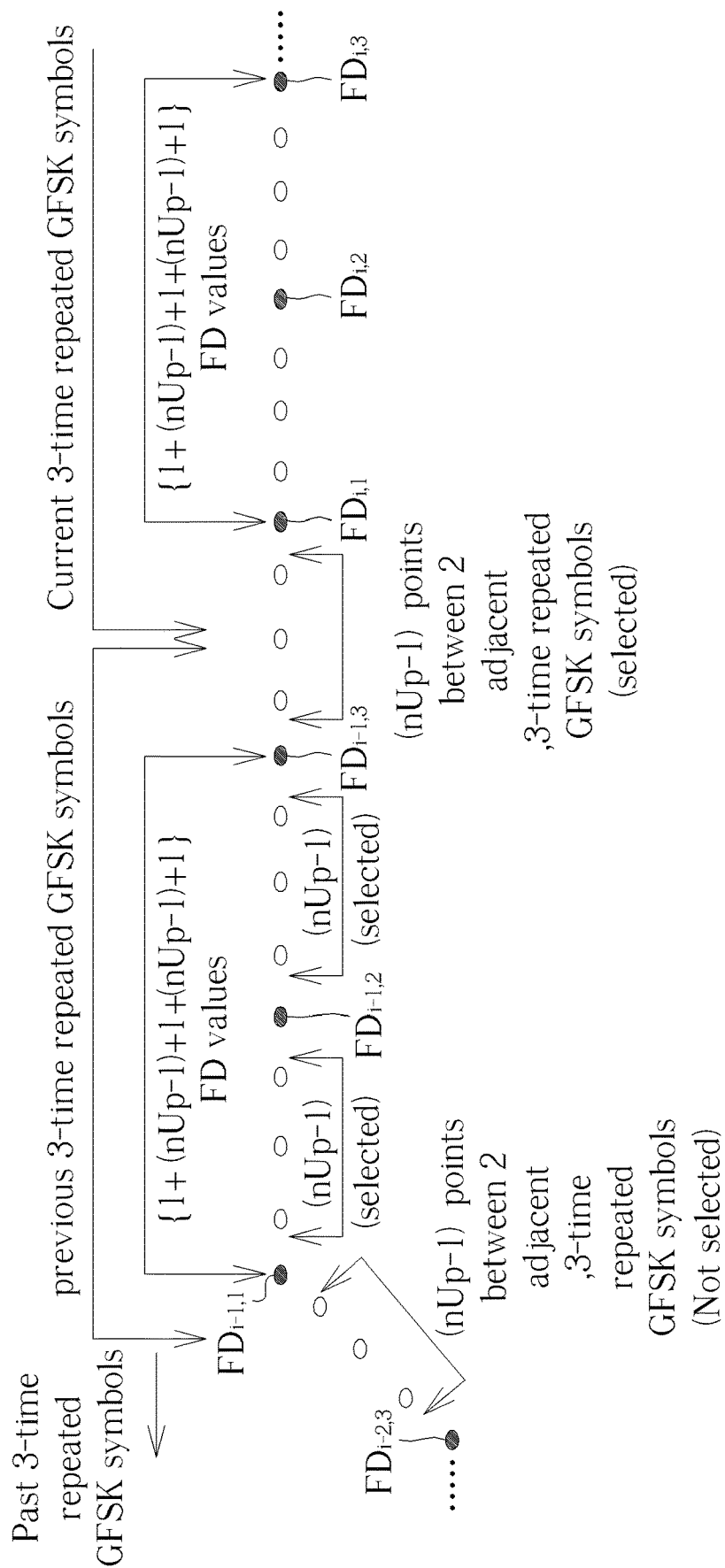
FIG. 8 is a diagram illustrating selection of FD values used for FO estimation according to the third FO estimation design proposed by the present invention.

Please refer to FIG. 8 in conjunction with FIG. 7. FIG. 8 is a diagram illustrating selection of FD values used for FO estimation according to the third FO estimation design proposed by the present invention. The sampling circuit 102 oversamples the frequency-modulated repetition-coded header A_IN (e.g., GFSK-modulated 3-time repetition coded header of BT packet) with a sampling rate higher than a GFSK symbol rate, such that up-sampled FD values $D_{FD}$ are provided to the majority decoding circuit 508. Supposing that each of total N (e.g., N=18) GFSK information bits is repeated M (e.g., M=3) times and nUp=4, there are 216 FD values, and FIG. 8 shows only a portion of 216 FD values for brevity. In a case where N=18 and M=3, the FD values of samples at the optimal sampling timing include $FD_{1,1}$, $FD_{1,2}$, $FD_{1,3}$, $FD_{2,1}$, $FD_{2,2}$, $FD_{2,3}$, $FD_{3,1}$, $FD_{3,2}$, $FD_{3,3}$, ..., $FD_{17,1}$, $FD_{17,2}$, $FD_{17,3}$, $FD_{18,1}$, $FD_{18,2}$ and $FD_{18,3}$.

Supposing that each of total N (e.g., N=18) GFSK information bits is repeated M (e.g., M=3) times, the majority decoding circuit 508 selects FD values $FD_{i,1}$, $FD_{i,2}$, $FD_{i,3}$ of samples at the optimal sampling timing and additional up-sampled FD values of samples between samples at the optimal sampling timing for calculating an FD sum $FD_{sum\{3+2(nUp-)\},i}$ ($FD_{sum\{3+2(nUp-1)\},i} = \Sigma_{j=1}^{M+(M-1)(nUp-1)} FD_{i,j}$, where i={1, 2, ..., N}, j={1, 2, ..., M+(M-1)(nUp-1))}, the value "3" in the subscript sum{3+2(nUp-1)},i is indicative of the number of repetition times, and $FD_{i,j}$=FD values selected in the $i^{th}$ repeated GFSK symbols), where the selected M+(M-1)(nUp-1) samples include first samples belonging to the same bit repetition group $G_i$ that begins with a first sample having the FD value $FD_{i,1}$ and ends with a first sample having the FD value $FD_{i,3}$ in the time domain, and also include second samples between two first samples having the FD values $FD_{i,1}$ and $FD_{i,2}$ in the time domain and second samples between two first samples having the FD values $FD_{i,2}$ and $FD_{i,3}$ in the time domain, where the first samples are obtained at optimal sampling timing, and the second samples are obtained at non-optimal sampling timing.

It should be noted that, in accordance with the third FO estimation design, some of FD values of samples at non-optimal sampling timing are selected for FO estimation, while some of FD values of samples at non-optimal sampling timing are not selected for FO estimation. The FD values of samples at non-optimal sampling timing include FD values of samples in each bit repetition group (e.g., FD values between $FD_{i,1}$ and $FD_{i,2}$ and FD values between $FD_{i,2}$ and $FD_{i,3}$, regarding the bit repetition group $G_i$) and FD values of samples between adjacent bit repetition groups. As shown in FIG. 8, a past bit repetition group $G_{i-2}$ ends with a sample having an FD value $FD_{i-2,3}$, and a previous bit repetition group $G_{i-1}$ begins with a sample having an FD value $FD_{i-1,i}$ and ends with a sample having an FD value $FD_{i-1,3}$. In this example, there is a bit transition "0"→"1" between the past bit repetition group $G_{i-2}$ and the previous bit repetition group $G_{i-1}$, and there is no bit transition "1"→"0" or "0"→"1" between the previous bit repetition group $G_{i-1}$ and the current bit repetition group $G_i$. In accordance with the third FO estimation design proposed by the present invention, FD values of samples between adjacent bit repetition groups $G_{i-2}$ and $G_{i-1}$ are not selected for FO estimation, while FD values of samples between adjacent bit repetition groups $G_{i-1}$ and $G_i$ are selected for FO estimation.

The accumulator circuit 512 is arranged to maintain the counter value Cnt_pos and the accumulated FD sum Sum (FD_pos), where the counter value Cnt_pos is initialized by a zero value, and the accumulated FD sum Sum(FD_pos) is initialized by a zero value. When the FD sum, for example, $FD_{sum\{3+2(nUp-1)\},i}$ in an M=3 case, is a non-negative value (i.e., $FD_{sum\{3+2(nUp-1)\},i} \geq 0$), the switch circuit 110 outputs the FD sum $FD_{sum\{3+2(nUp-1)\},i}$ to the accumulator circuit 512, and the accumulator circuit 512 updates the counter value Cnt_pos and the accumulated FD sum Sum(FD_pos), where Cnt_pos=Cnt_pos+3+2(nUp-1) and Sum(FD_pos)= Sum(FD_pos)+$FD_{sum\{3+2(nUp-1)\},i}$. Since each FD sum $FD_{sum\{3+2(nUp-1)\},i}$ is derived from accumulating [3+2 (nUp-1)] FD values, an increment of the counter value Cnt_pos is set by [3+2(nUp-1)]. The accumulator circuit 514 is arranged to maintain a counter value Cnt_neg and an accumulated FD sum Sum(FD_neg), where the counter value Cnt_neg is initialized by a zero value, and the accumulated FD sum Sum(FD_neg) is initialized by a zero value. When the FD sum $FD_{sum\{3+2(nUp-1)\},i}$ is a negative value (i.e., $FD_{sum\{3+2(nUp-1)\},i} < 0$), the switch circuit 110 outputs the FD sum $FD_{sum\{3+2(nUp-1)\},i}$ to the accumulator circuit 514, and the accumulator circuit 514 updates the counter value Cnt_neg and the accumulated FD sum Sum(FD_neg), where Cnt_neg=Cnt_neg+3+2(nUp-1) and Sum(FD_neg)= Sum(FD_neg)+$FD_{sum\{3+2(nUp-1)\},i}$. Since each FD sum $FD_{sum\{3+2(nUp-1)\},i}$ is derived from accumulating [3+2 (nUp-1)] FD values, an increment of the counter value Cnt_neg is set by [3+2(nUp-1)]. In addition, the counter value Cnt_pos and the accumulated FD sum Sum(FD_pos) may be further updated by the processing circuit 712 in response to TR=0 and FD_TR=1, and the counter value Cnt_neg and the accumulated FD sum Sum(FD_neg) may be further updated by the processing circuit 712 in response to TR=0 and FD_TR=0. To put it simply, when one FD sum $FD_{sum\{3+2(nUp-1)\}}$ is output from the majority decoding circuit 508, one of the counter values Cnt_pos, Cnt_neg is updated and one of the accumulated FD sums Sum(FD_pos), Sum(FD_neg) is updated, and when TR=0 is set by the decision circuit 710, one of the counter values Cnt_pos, Cnt_neg is further updated and one of the accumulated FD sums Sum(FD_pos), Sum(FD_neg) is further updated.

When the last sample of the frequency-modulated repetition-coded header A_IN (e.g., GFSK-modulated 3-time repetition coded header of BT packet) is generated by the sampling circuit 102, the sampling circuit 102 informs the FO estimation circuit 116 of the end of the frequency-modulated repetition-coded header A_IN (e.g., GFSK-modulated 3-time repetition coded header of BT packet). The FO estimation circuit 116 is arranged to calculate the FO value FO_OUT at the end of the frequency-modulated repetition-coded header A_IN (e.g., GFSK-modulated 3-time repetition coded header of BT packet) indicated by the sampling circuit 102. For example, estimation of the FO value FO_OUT can be expressed using the aforementioned formula (1).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frequency offset (FO) estimation method comprising:
   sampling a frequency-modulated repetition-coded segment of a packet to generate a plurality of samples;
   obtaining a complete frequency deviation (FD) value for each of a plurality of target samples selected from the plurality of samples; and
   estimating an FO value through accumulating complete FD values of the plurality of target samples;
   wherein a number of the plurality of target samples is larger than a number of bits carried by the frequency-modulated repetition-coded segment.

2. The FO estimation method of claim 1, wherein the packet is a Bluetooth (BT) packet.

3. The FO estimation method of claim 1, wherein sampling the frequency-modulated repetition-coded segment of the packet to generate the plurality of samples comprises:
   oversampling the frequency-modulated repetition-coded segment to generate the plurality of samples;
   the FO estimation method further comprises:
   determining optimal sampling timing for the frequency-modulated repetition-coded segment;

the plurality of target samples comprises:
- a plurality of first target samples, each obtained from sampling the frequency-modulated repetition-coded segment at the optimal sampling timing; and
- a plurality of second target samples, each obtained from sampling the frequency-modulated repetition-coded segment at a non-optimal sampling timing.

4. The FO estimation method of claim 3, wherein the plurality of first target samples comprises a first sample and a second sample both corresponding to a first repetition bit group, and the plurality of second target samples comprises third samples obtained between the first sample and the second sample in a time domain.

5. The FO estimation method of claim 4, wherein the first repetition bit group ends with the second sample; the plurality of first target samples further comprise a fourth sample corresponding to a second repetition bit group the first repetition bit group, where the second repetition bit group begins with the fourth sample, and there is no bit transition between the first repetition bit group and the second repetition bit group; and the plurality of second target samples further comprise fifth samples obtained between the second sample and the fourth sample in the time domain.

6. The FO estimation method of claim 4, wherein the first repetition bit group begins with the first sample; the plurality of first target samples further comprise a fourth sample corresponding to a second repetition bit group preceding the first repetition bit group, where the second repetition bit group ends with the fourth sample, and there is no bit transition between the second repetition bit group and the first repetition bit group; and the plurality of second target samples further comprise fifth samples obtained between the fourth sample and the first sample in a time domain.

7. A frequency offset (FO) estimation apparatus comprising:
- a sampling circuit, arranged to sample a frequency-modulated repetition-coded segment of a packet to generate a plurality of samples;
- a frequency deviation (FD) computation circuit, arranged to obtain a complete FD value for each of a plurality of target samples selected from the plurality of samples output from the sampling circuit; and
- an FO computation circuit, arranged to estimate an FO value through accumulating complete FD values of the plurality of target samples;

wherein a number of the plurality of target samples is larger than a number of bits carried by the frequency-modulated repetition-coded segment.

8. The FO estimation apparatus of claim 7, wherein the packet is a Bluetooth (BT) packet.

9. The FO estimation apparatus of claim 7, wherein the sampling circuit is arranged to generate the plurality of samples by oversampling the frequency-modulated repetition-coded segment, and is further arranged to determine optimal sampling timing for the frequency-modulated repetition-coded segment; and the plurality of target samples comprises:
- a plurality of first target samples, each obtained from sampling the frequency-modulated repetition-coded segment at the optimal sampling timing; and
- a plurality of second target samples, each obtained from sampling the frequency-modulated repetition-coded segment at a non-optimal sampling timing.

10. The FO estimation apparatus of claim 9, wherein the plurality of first target samples comprises a first sample and a second sample both corresponding to a first repetition bit group, and the plurality of second target samples comprises third samples obtained between the first sample and the second sample in a time domain.

11. The FO estimation apparatus of claim 10, wherein the first repetition bit group ends with the second sample; the plurality of first target samples further comprise a fourth sample corresponding to a second repetition bit group following the first repetition bit group, where the second repetition bit group begins with the fourth sample, and there is no bit transition between the first repetition bit group and the second repetition bit group; and the plurality of second target samples further comprise fifth samples obtained between the second sample and the fourth sample in the time domain.

12. The FO estimation apparatus of claim 10, wherein the first repetition bit group begins with the first sample; the plurality of first target samples further comprise a fourth sample corresponding to a second repetition bit group preceding the first repetition bit group, where the second repetition bit group ends with the fourth sample, and there is no bit transition between the second repetition bit group and the first repetition bit group; and the plurality of second target samples further comprise fifth samples obtained between the fourth sample and the first sample in a time domain.

13. A frequency offset (FO) estimation method comprising:
- determining optimal sampling timing for a frequency-modulated repetition-coded segment of a packet;
- sampling the frequency-modulated repetition-coded segment to generate a plurality of samples;
- obtaining a frequency deviation (FD) value for each of a plurality of target samples selected from the plurality of samples, wherein the target samples comprise first samples obtained from sampling the frequency-modulated repetition-coded segment at non-optimal sampling timing; and
- estimating an FO value through accumulating FD values of the plurality of target samples.

14. The FO estimation method of claim 13, wherein the target samples further comprise second samples obtained from sampling the frequency-modulated repetition-coded segment at the optimal sampling timing.

* * * * *